United States Patent
Ra et al.

(10) Patent No.: US 9,196,063 B2
(45) Date of Patent: Nov. 24, 2015

(54) SUPER-RESOLUTION APPARATUS AND METHOD

(71) Applicants: Jong Beom Ra, Daejeon (KR); Il Jun Ahn, Daejeon (KR); Ji Hye Kim, Gyeonggi-do (KR); Yong Jin Chang, Incheon (KR)

(72) Inventors: Jong Beom Ra, Daejeon (KR); Il Jun Ahn, Daejeon (KR); Ji Hye Kim, Gyeonggi-do (KR); Yong Jin Chang, Incheon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/182,882

(22) Filed: Feb. 18, 2014

(65) Prior Publication Data

US 2014/0328528 A1 Nov. 6, 2014

(30) Foreign Application Priority Data

May 2, 2013 (KR) .................. 10-2013-0049155
Dec. 12, 2013 (KR) .................. 10-2013-0154555

(51) Int. Cl.
*G06K 9/00* (2006.01)
*G06T 11/00* (2006.01)
*A61B 6/00* (2006.01)

(52) U.S. Cl.
CPC .................................. *G06T 11/005* (2013.01)

(58) Field of Classification Search
CPC .................. G06T 11/00; A61B 6/00
USPC .............. 382/128–134; 378/4, 8, 21–27, 901; 600/407, 410, 411, 425, 427
See application file for complete search history.

(56) References Cited

U.S. PATENT DOCUMENTS 8,761,478 B2 * 6/2014 Hsieh et al. .................. 382/131
9,064,305 B2 * 6/2015 Song et al. ............................ 1/1

* cited by examiner

*Primary Examiner* — Abolfazl Tabatabai
(74) *Attorney, Agent, or Firm* — Saliwanchik, Lloyd & Eisenschenk (57) ABSTRACT

An image-based super-resolution method using a cone-beam-based line-of-response (LOR) reconfiguration in a positron emission tomography (PET) image is provided. That is, an apparatus and method for reconfiguring a super-resolution PET image using a cone-beam-based LOR reconfiguration is provided.

15 Claims, 10 Drawing Sheets

SUPER-RESOLUTION APPARATUS AND METHOD

CROSS-REFERENCE TO RELATED APPLICATION

This application claims the priority benefit of Korean Patent Application No. 10-2013-0049155, filed on May 2, 2013 and Korean Patent Application No. 10-2013-0154555, filed on Dec. 12, 2013 in the Korean Intellectual Property Office, the disclosure of which is incorporated herein by reference.

BACKGROUND

1. Field of the Invention

The present invention relates to an image-based super-resolution method using a cone-beam-based line-of-response (LOR) reconfiguration in a positron emission tomography (PET) image, and more particularly, to an apparatus and method for reconfiguring a super-resolution PET image using a cone-beam-based LOR reconfiguration. Further, the present invention relates to a technique for quickly and efficiently acquiring a point spread function (PSF) at each of all voxel locations.

2. Description of the Related Art

A positron emission tomography (PET) has been widely used as one of nuclear medicine test methods capable of three-dimensionally representing physiological, chemical and functional images of a human body using radiopharmaceuticals that emit positrons.

In general, the PET has been used to diagnose various types of cancers and may provide the useful results with respect to a differential diagnosis on a cancer, clinical staging, an evaluation of recurrence, and a determination as to the treatment effect. In addition, a receptor image or a metabolic image used for evaluating heart disease, brain disease, and brain functions may be acquired using the PET.

A positron emitted from a radioactive isotope consumes all of the self-kinetic energy during a very short period of time after its emission and is coupled with a neighboring electron, thereby becoming extinct. In this instance, two annihilation radiations, for example, gamma rays are emitted at an angle of 180 degrees.

A cylindrical PET scanner may detect the simultaneously emitted two annihilation radiations. When an image is reconfigured using the detected radiations, a location at which radiopharmaceuticals are gathered in a body and an amount of the gathered radiopharmaceuticals may be represented as a three-dimensional (3D) tomography image.

An expectation maximization (EM)-based iterative image reconfiguration method, such as a maximum likelihood expectation maximization (MLEM) algorithm, an ordered-subset expectation maximization (OSEM) algorithm, and a maximum a priori expectation maximization (MAP-EM) algorithm, for example, may be used as a PET image reconfiguration algorithm.

However, the PET image reconfiguration algorithm has a relatively low resolution and thus, a super-resolution algorithm of generating a plurality of sinogram sets by changing a sampling location through wobbling of a PET system may be applied. Accordingly, a plurality of reconfiguration processes is performed, leading to using a large amount of calculation and time. That is, a large amount of calculation and a large amount of time are used, which results in increasing an image reconfiguration complexity.

Figure 1:
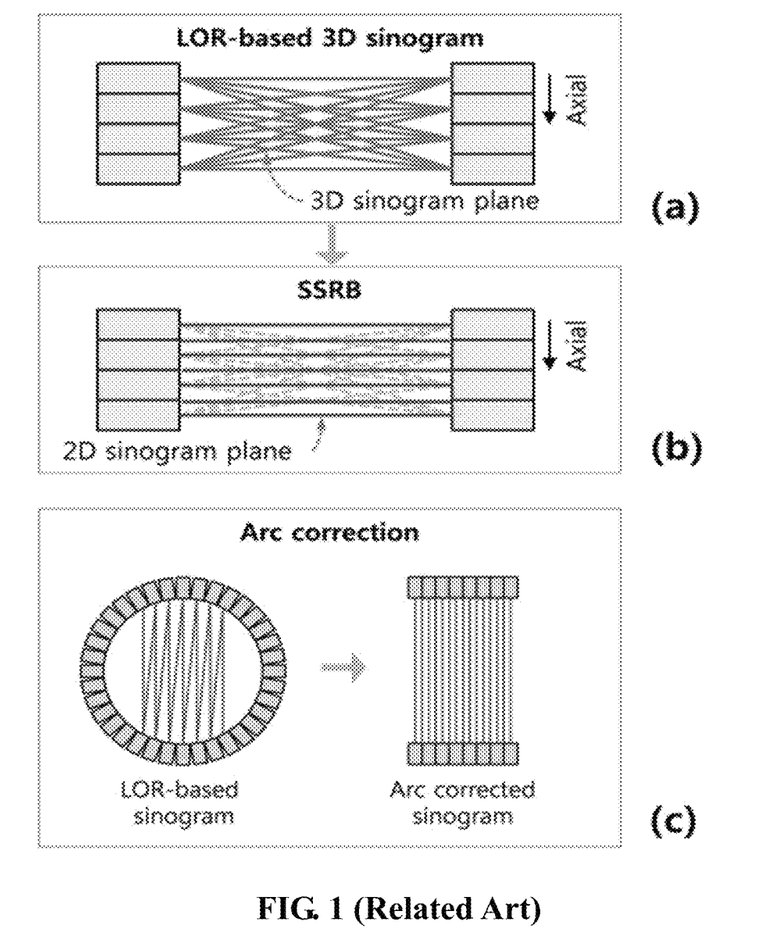
FIG. 1, blocks (a), (b), and (c), illustrate an image reconfiguration preprocessing process according to a related art.

In general, a PET system may acquire data, for example, a line of response (LOR) from a PET detector as illustrated in block (a) of FIG. 1. FIG. 1, blocks (a), (b), and (c), illustrate an image reconfiguration preprocessing process according to a related art.

In the related art, to simplify an image reconfiguration algorithm, the PET system may perform a preprocessing process, such as single slice rebinning (SSRB) and arc correction, for example, on a sinogram as illustrated in blocks (b) and (c) of FIG. 1.

During the image reconfiguration preprocessing process according to the related art, a blur may occur in a sinogram. Thus, when an image reconfiguration is performed based on the sinogram, quality of a PET image may be degraded.

Also, in the related art, the image reconfiguration algorithm may be simplified through the preprocessing process such as the SSRB and the arc correction. On the contrary, accuracy may be decreased by a predetermined level and a parallel processing operation may not be performed on a forward projection and a back-projection. An LOR reconfiguration method according to the related art may be inappropriate for performing such parallel processing operation.

Moreover, it may be substantially impossible for a medical imaging system to measure a point spread function (PSF) with respect to all of voxel locations. Accordingly, an existing PSF acquiring technique may measure a PSF at a predetermined voxel location using a Monte-Carlo (MC) simulation.

However, when the medical imaging system measures a PSF with respect to all of voxel locations using only the MC simulation, a large amount of calculation may be required. Accordingly, a large amount of time may be used for processing and a storage memory may also use a large space.

BRIEF SUMMARY

Accordingly, provided is an image reconfiguration algorithm capable of quickly performing an image reconfiguration process without a need to preprocess a sinogram, in order to acquire a positron emission tomography (PET) having a further enhanced resolution.

Also, provided is a method of decreasing an image reconfiguration complexity by applying, to an image reconfiguration algorithm, a projection method suitable for parallel processing and a sinogram format.

Also, provided is a method capable of acquiring a super-resolution PET image through one-step algorithm processing by merging an existing PET image reconfiguration algorithm and a super-resolution algorithm.

Also, provided is a method capable of acquiring a more accurate super-resolution PET image by modeling a blur of a point corresponding to each location of a PET system.

The present invention is conceived to outperform the issues found in the related art and to meet the above-noted requirements and thus, provides an image-based super-resolution method using a cone-beam-based line of response (LOR) reconfiguration in a PET image, that is, an apparatus and method for reconfiguring a super-resolution PET image using a cone-beam-based LOR reconfiguration.

Also, embodiments of the present invention provide a method, apparatus, and system for quickly and efficiently acquiring a point spread function (PSF) with respect to all of voxel locations of a medical imaging system by interpolating a PSF measured at the medical imaging system.

Also, embodiments of the present invention also provide a method, apparatus, and system for interpolating a PSF by measuring a PSF sinogram with respect to all of voxel locations, to minimize a number of voxel locations of a medical imaging system based on symmetry of the medical imaging system.

Also, embodiments of the present invention also provide a method, apparatus, and system for performing a non-rigid registration during a process of interpolating a PSF.

According to an aspect of the present invention, there is provided an apparatus for reconfiguring a PET image, the apparatus including: a blur modeling unit configured to model a blur by generating a PSF kernel corresponding to each location of a PET system; an LOR acquirer configured to acquire an LOR and a sinogram corresponding to each location by wobbling the PET system; a cone-beam sinogram converter configured to convert, to a sinogram format in a cone-beam shape, an LOR-based sinogram acquired by the LOR acquirer; a sinogram modeling unit configured to model the sinogram format-converted to the cone-beam shape by the cone-beam sinogram converter; and a high-resolution image inducer configured to induce a high-resolution image using the sinogram modeled by the sinogram modeling unit.

According to another aspect of the present invention, there is provided a method of reconfiguring a PET image, the method including: modeling a blur by generating a PSF kernel corresponding to each location of a PET system; acquiring an LOR and a sinogram corresponding to each location by wobbling the PET system; converting, to a sinogram format in a cone-beam shape, an acquired LOR-based sinogram; modeling the sinogram format-converted to the cone-beam shape; and inducing a high-resolution image using the modeled sinogram.

According to still another aspect of the present invention, there is provided a method of interpolating a PSF using a non-rigid registration in a medical image, the method including: measuring a PSF sinogram with respect to at least one voxel location among a plurality of voxel locations of a medical imaging system by performing a Monte-Carlo (MC) simulation based on symmetry of the medical imaging system; imaging the measured PSF sinogram using a predetermined image reconfiguration algorithm; acquiring a deformation field by performing a non-rigid registration on the imaged PSF; and interpolating the PSF with respect to remaining voxel locations excluding the at least one voxel location from among the plurality of voxel locations of the medical imaging system, using the acquired deformation field.

The measuring of the PSF sinogram may include measuring the PSF sinogram with respect to the at least one voxel location to minimize the number of the at least one voxel location.

The acquiring of the deformation field may include up-sampling the imaged PSF.

The method of interpolating a PSF using a non-rigid registration in a medical image may further include down-sampling the interpolated PSF.

The acquiring of the deformation field may include: locally deforming a source image of the imaged PSF using a B-spline free form deformation (FFD) based on a deformation function; calculating normalized mutual information (NMI) of the source image and a target image using a two-dimensional (2D) combined histogram that is calculated based on brightness values between the deformed source image and the target image of the imaged PSF; performing an optimization process of updating the deformation function using a cost function based on the NMI of the source image and the target image; and generating an image that matches the target image by applying, to the source image, variables calculated through the optimization process of the deformation function.

The imaging of the measured PSF sinogram may include imaging the measured PSF sinogram using at least one of an ordered subset expectation maximization (OSEM) algorithm, an LOR-based OSEM algorithm, a deblur algorithm, and a super-resolution algorithm.

According to still another aspect of the present invention, there is provided a method of interpolating a PSF using a non-rigid registration in a medical image, the method including: measuring a PSF sinogram with respect to at least one voxel location to minimize the number of the at least one voxel location among a plurality of voxel locations of a medical imaging system by performing an MC simulation based on symmetry of the medical imaging system; imaging the measured PSF sinogram using a predetermined image reconfiguration algorithm; up-sampling the imaged PSF; acquiring a deformation field by performing a non-rigid registration on the imaged PSF; interpolating the PSF with respect to remaining voxel locations excluding the at least one voxel location from among the plurality of voxel locations of the medical imaging system, using the acquired deformation field; and down-sampling the interpolated PSF.

According to still another aspect of the present invention, there is provided an apparatus for interpolating a PSF using a non-rigid registration in a medical image, the apparatus including: a PSF sinogram measurer configured to measure a PSF sinogram with respect to at least one voxel location among a plurality of voxel locations of a medical imaging system by performing an MC simulation based on symmetry of the medical imaging system; an imaging unit configured to image the measured PSF sinogram using a predetermined image reconfiguration algorithm; a deformation field acquirer configured to acquire a deformation field by performing a non-rigid registration on the imaged PSF; and an interpolator configured to interpolate the PSF with respect to remaining voxel locations excluding the at least one voxel location from among the plurality of voxel locations of the medical imaging system, using the acquired deformation field.

The PSF sinogram measurer may measure the PSF sinogram with respect to the at least one voxel location to minimize the number of the at least one voxel location.

The deformation field acquirer may include an up-sampler configured to up-sample the imaged PSF.

The apparatus for interpolating a PSF using a non-rigid registration in a medical image may further include a down-sampler configured to down-sample the interpolated PSF.

BRIEF DESCRIPTION OF THE DRAWINGS

These and/or other aspects, features, and advantages of the invention will become apparent and more readily appreciated from the following description of exemplary embodiments, taken in junction with the accompanying drawings of which.

DETAILED DESCRIPTION

Advantages and features of the present invention and a method to achieve the same will be clearly understood from embodiments to be described by referring to the accompanying drawings. Accordingly, those skilled in the art may easily carryout the technical spirit of the present invention. Also, when it is determined that a detailed description related to a related known function or configuration they may make the purpose of the present invention unnecessarily ambiguous in describing the present invention, the detailed description will be omitted here. Like reference numerals refer to like elements throughout. Hereinafter, embodiments of the present invention will be described with reference to the accompanying drawings.

Initially, point spread function (PSF) kernel-based blur modeling according to the present invention will be described with reference to FIG. 2, and wobbling-based high-resolution sampling will be described with reference to FIG. 3.

Figure 2:
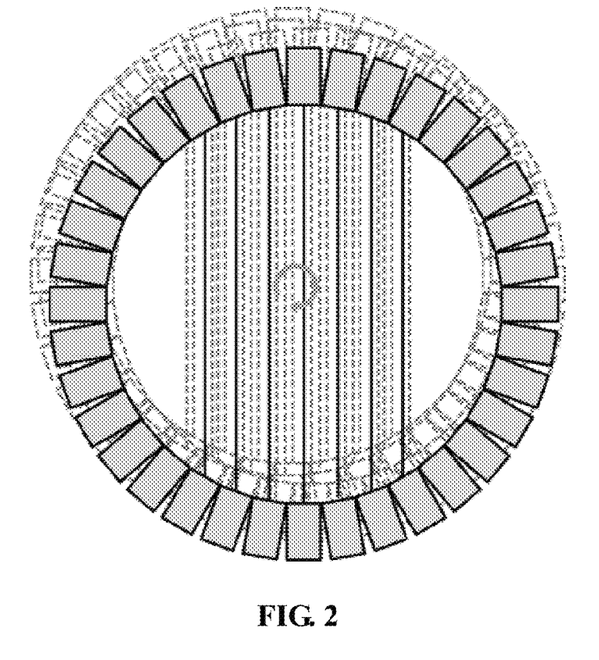
FIG. 2 illustrates an example of a change in a point spread function (PSF) based on a location of a positron emission tomography (PET) system according to an embodiment of the present invention.
Figure 3:
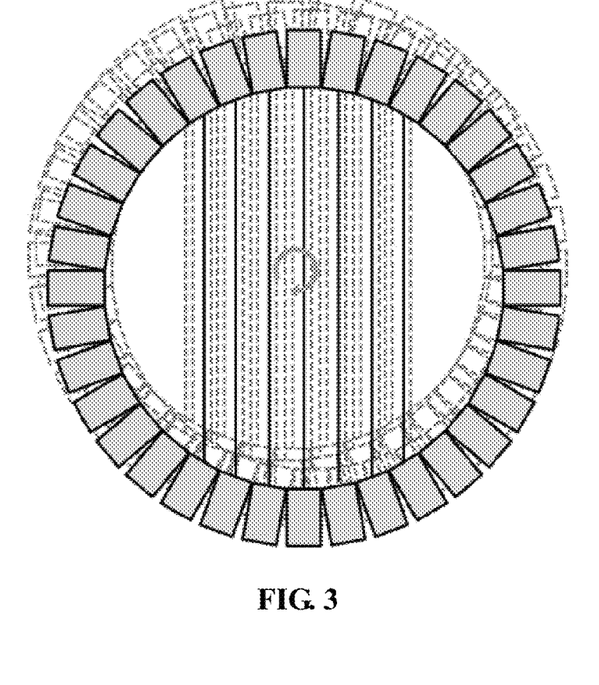
FIG. 3 illustrates an example of a sampling method performed in response to a wobbling motion of a PET system according to an embodiment of the present invention.

FIG. 2 illustrates an example of a change in a PSF based on a location of a positron emission tomography (PET) system according to an embodiment of the present invention, and FIG. 3 illustrates an example of a sampling method performed in response to a wobbling motion of a PET system according to an embodiment of the present invention.

Referring to FIG. 2, a PSF of a sample measured by a detector of the PET system varies and accordingly, a PSF of a reconfigured PET image also varies based on a location. An image having a further enhanced resolution may be acquired by measuring a PSF based on a location of a PET image using the above-noted property, by reconfiguring each PSF as an image, and by applying a different PSF as a PSF kernel of a super-resolution algorithm based on a location in a case of applying the super-resolution algorithm.

Referring to FIG. 3, when classifying sinograms measured at the respective locations and reconfiguring the measured sinograms by wobbling the PET system, such as wobbling the detector or wobbling a bed on which a human is lying down, a translated image set may be generated. The super-resolution algorithm may be applied using such PET images.

Hereinafter, the present invention will be further described with reference to the accompanying drawings.

Figure 4:
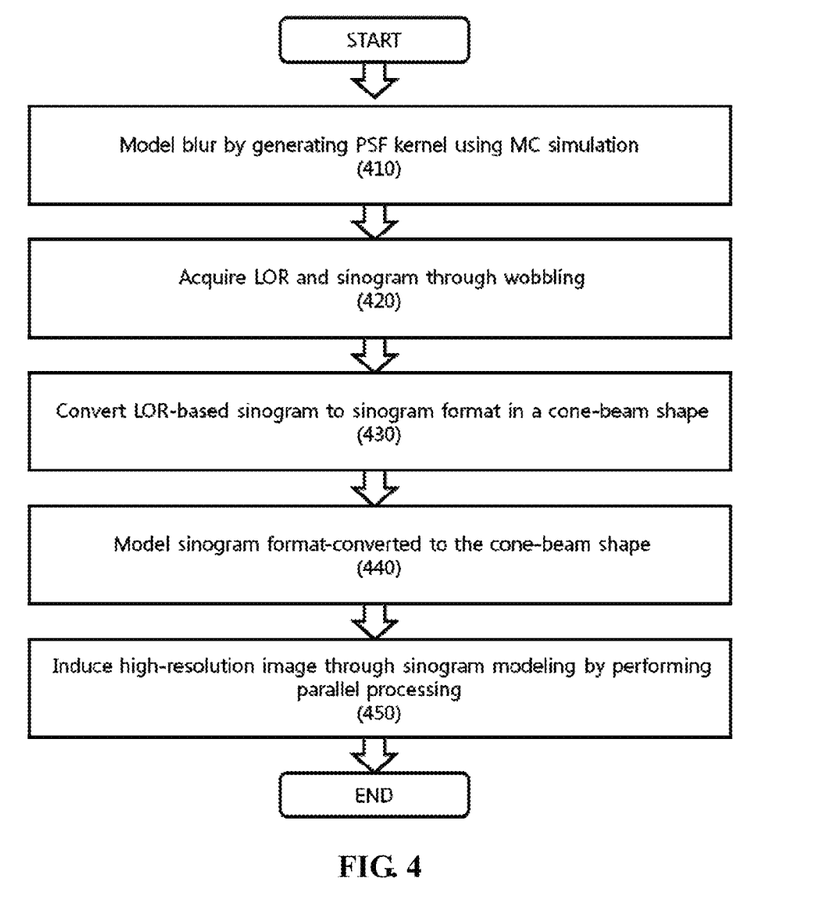
FIG. 4 is a flowchart illustrating a method of reconfiguring a super-resolution PET image using a cone-beam-based line of response (LOR) reconfiguration according to an embodiment of the present invention.
Figure 5:
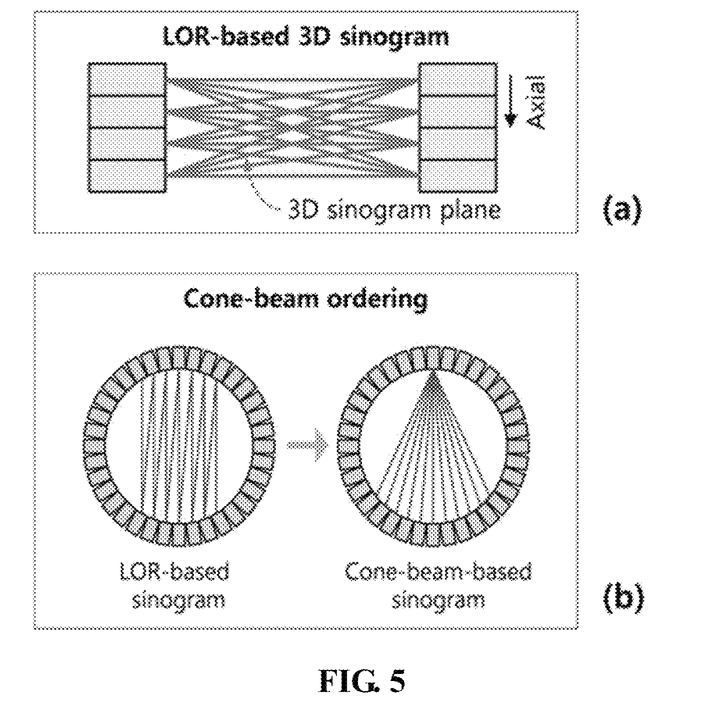
FIG. 5, blocks (a) and (b), illustrate examples of a cone-beam-based LOR reconfiguration according to an embodiment of the present invention.
Figure 6:
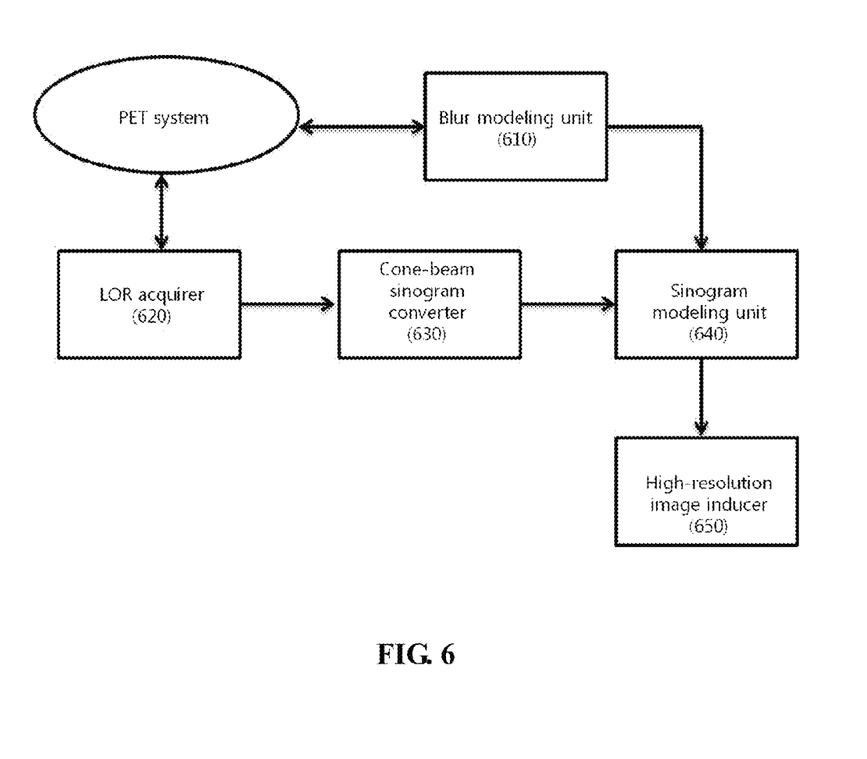
FIG. 6 is a block diagram illustrating a configuration of an apparatus for reconfiguring a super-resolution PET image using a cone-beam-based LOR reconfiguration according to an embodiment of the present invention.

FIG. 4 is a flowchart illustrating a method of reconfiguring a super-resolution PET image using a cone-beam-based line of response (LOR) reconfiguration according to an embodiment of the present invention, FIG. 5, blocks (a) and (b), illustrate examples of a cone-beam-based LOR reconfiguration according to an embodiment of the present invention, and FIG. 6 is a block diagram illustrating a configuration of an apparatus for reconfiguring a super-resolution PET image using a cone-beam-based LOR reconfiguration according to an embodiment of the present invention.

In operation 410, a blur modeling database may be generated by generating a PSF kernel corresponding to each location of a PET system using a Mote-Carlo (MC) simulation. That is, referring to FIG. 2, the blur modeling database may be generated by generating a PSF kernel by applying the MC simulation based on a point source.

Hereinafter, PSF kernel-based blur modeling of the present invention will be described.

Due to physical phenomena such as a positron range, a non-linearity, a detector crystal width, and a block effect, a blur may occur in the PET system regardless of the absence of a motion. A blur may differently occur based on a structure of the detector. For example, each PET system may have a unique blur. Accordingly, recognizing a unique blur kernel of the PET system becomes an issue to effectively apply a super-resolution algorithm.

In the related art, it is assumed that a blur kernel of a PET system is recognized in advance. That is, the blur kernel of the PET system may be predicted based on predetermined blur kernel information. However, as described above, since a blur kernel may be different for each PET system, information on a blur kernel of each PET system needs to be accurately estimated when performing an image reconfiguration. Only in this case, the performance of the super-resolution algorithm may be enhanced.

Accordingly, the present invention may generate the blur modeling database by generating the PSF kernel corresponding to each location of the PET system using the MC simulation, and may apply the generated blur modeling database to the super-resolution algorithm when performing an image reconfiguration.

In operation 420, an LOR and a sinogram corresponding to each location may be acquired by wobbling the PET system as illustrated in FIG. 3. Here, the acquired sinogram has been generated based on the LOR.

A relationship between wobbling of the present invention and the super-resolution algorithm may be described as follows. A sinogram set may be acquired using a sinogram acquired at each location through wobbling.

In operation 430, the entire LOR-based sinograms may be converted to a sinogram format in a cone-beam shape, for example, a quadrangular pyramid shape as illustrated in FIG. 5. The present invention may perform an image reconfiguration in parallel using a graphics processing unit (GPU), based on the above cone-beam-based LOR reconfiguration. The cone-beam-based LOR reconfiguration of the present invention will be further described below to help understanding of the present invention.

In operation 440, the sinogram format-converted to the cone-beam shape may be modeled according to Equation 1 below. The present invention may model projected data to the sinogram by warping a high-resolution image through wobbling and by blurring and down-sampling the warped high-resolution image as expressed by Equation 1. Modeling a sinogram according to Equation 1 may be defined herein as the super-resolution algorithm. That is, the present invention may convert, to a super-resolution sinogram, the sinogram format-converted to the cone-beam shape and thereby perform a high-resolution image reconfiguration.

$$y_k = AD_k B_k R_k X \quad \text{[Equation 1]}$$

In Equation 1, $y_k$ denotes a k-th low-resolution sinogram, A denotes a system projection matrix, D denotes a down-sampling matrix, B denotes a blurring matrix, R denotes a wobbling matrix, and X denotes a high-resolution image.

In particular, a modeling method of projecting and then blurring an image may be considered to model the sinogram format-converted to the cone-beam shape. However, this modeling method needs to blur projected data and thus, an amount of calculation and a complexity may increase, leading to decreasing a processing rate.

According to an embodiment of the present invention, it is possible to decrease an amount of calculation and a complexity and thereby guarantee a fast image reconfiguration processing rate by burring an image and then performing a projection based on a sinogram format-converted to a cone-beam shape, as expressed by Equation 1 and Equation 2.

In operation 450, the high-resolution image X may be induced through sinogram modeling by performing a GPU parallel processing operation using an iterative reconfiguration algorithm. A maximum likelihood expectation maximization (MLEM) algorithm is described herein as a representative example of the iterative reconfiguration algorithm. However, an EM-based iterative algorithm, such as an ordered-subset expectation maximization (OSEM) algorithm, and a maximum a priori expectation maximization (MAP-EM) algorithm, for example, may also be applied to the present invention.

The high-resolution image X may be induced using the MLEM algorithm as expressed by Equation 2.

$$X^{n+1} = X^n \frac{\sum_k R_k^T B_k^T D_k^T A^T \frac{y_k}{AD_k B_k R_k X^n}}{\sum_k R_k^T B_k^T D_k^T A^T 1}$$ [Equation 2]

Referring to Equation 2, it can be verified that a plurality of forward projections "A" and a plurality of back-projections "$A^T$" are required when performing the iterative reconfiguration algorithm in order to induce the high-resolution image X. Hereinafter, the cone-beam-based LOR reconfiguration of the present invention will be further described.

When performing modeling based on a general LOR to perform an operation on the plurality of forward projections "A" and the plurality of back-projections "$A^T$", processing of a parallel operation may be difficult.

That is, an operation may be performed on all of the forward projections and the back-projections using a line-driven method and a voxel-driven method, which may be performed using different operators as shown in Table 1 below. When performing a parallel processing operation using a scatter operator, a data loss may occur. Although an atomic operator may be used to prevent the data loss, a large amount of cost may be used and thus, a parallel processing performance may be significantly degraded. Accordingly, a gather operator may need to be used to maximize the parallel processing performance.

That is, when performing parallel processing using the MLEM algorithm, it is optimal to perform an operation on a forward projection using a line-driven method and to perform an operation on a back-projection using a voxel-driven method. However, in a general sinogram format in a parallel beam shape, it may be difficult to perform an operation on the back-projection using the voxel-driven method. A combination of LORs neighboring each voxel needs to be calculated to apply the voxel-driven method. However, a combination calculation process is complex in the aforementioned general sinogram format.

To solve the above issue, the present invention may perform an image reconfiguration using a cone-beam-based LOR reconfiguration by converting, to a sinogram format in a cone-beam shape, for example, a rectangular pyramid shape, the entire LORs acquired by the PET system as described above with reference to FIG. 5 and operation 430 of FIG. 4.

Describing again FIG. 5 and operation 430, when reconfiguring LORs based on a cone-beam, a combination of LORs may be calculated with a relatively small amount of calculation using a cone that uses a crystal of a detector as a vertex. Accordingly, it is possible to perform an operation on a voxel-driven-based back-projection using a gather operator. Although a sinogram format is converted to a cone-beam shape, the line-driven method may be continuously used for a forward projection. Accordingly, it is possible to perform the entire MLEM process using a gather operator suitable for GPU.

For example, LORs may be converted to a sinogram format in a shape of a cone shape that uses, as a vertex, a crystal of a first detector in a first area. The LORs converted to the sinogram format in the cone shape may be spread in a cone shape in a second area in which a second detector is present by using, as the vertex, the crystal of the first detector in the first area. Here, the second detector present in the second area may be located to face the first detector present in the first area in a circular shape.

Table 1 shows a scatter operator and a gather operator in the MLEM algorithm.

TABLE 1

|  | Forward projection | Back-projection |
| --- | --- | --- |
| Line-driven | Gather | Scatter |
| Voxel-driven | Scatter | Gather |

Hereinafter, parallel processing of a forward projection and a back-projection when performing an image reconfiguration according to an embodiment of the present invention will be described. Parallel processing refers to a method in which a plurality of operation cores divides the same work and thereby simultaneously operates the divided works. A GPU or a central processing unit (CPU) including a multi-core may be used for parallel processing. The GPU may perform large scale parallel processing by including tens to hundreds of cores, and may also process a graphics operation and a mathematical operation.

FIG. 6 is a block diagram illustrating a configuration of an apparatus (hereinafter, an image reconfiguration apparatus) for reconfiguring a super-resolution PET image using a cone-beam-based LOR reconfiguration according to an embodiment of the present invention.

Referring to FIG. 6, the image reconfiguration apparatus may include a blur modeling unit 610, an LOR acquirer 620, a cone-beam sinogram converter 630, a sinogram modeling unit 640, and a high-resolution image inducer 650.

The blur modeling unit 610 may generate a blur modeling database by generating a PSF kernel corresponding to each location of a PET system using an MC simulation.

The LOR acquirer 620 may acquire an LOR and a sinogram corresponding to each location by wobbling the PET system as illustrated in FIG. 3.

The cone-beam sinogram converter 630 may convert, to a sinogram format in a cone-beam shape, for example, a rectangular pyramid shape, the entire LOR-based sinograms acquired by the PET system as illustrated in FIG. 5.

The sinogram modeling unit 640 may model the sinogram format-converted to the cone-beam shape according to Equation 1.

The high-resolution image inducer 650 may induce a high-resolution image X through sinogram modeling by performing a GPU parallel processing operation using an iterative reconfiguration algorithm as expressed by Equation 2.

Figure 7:
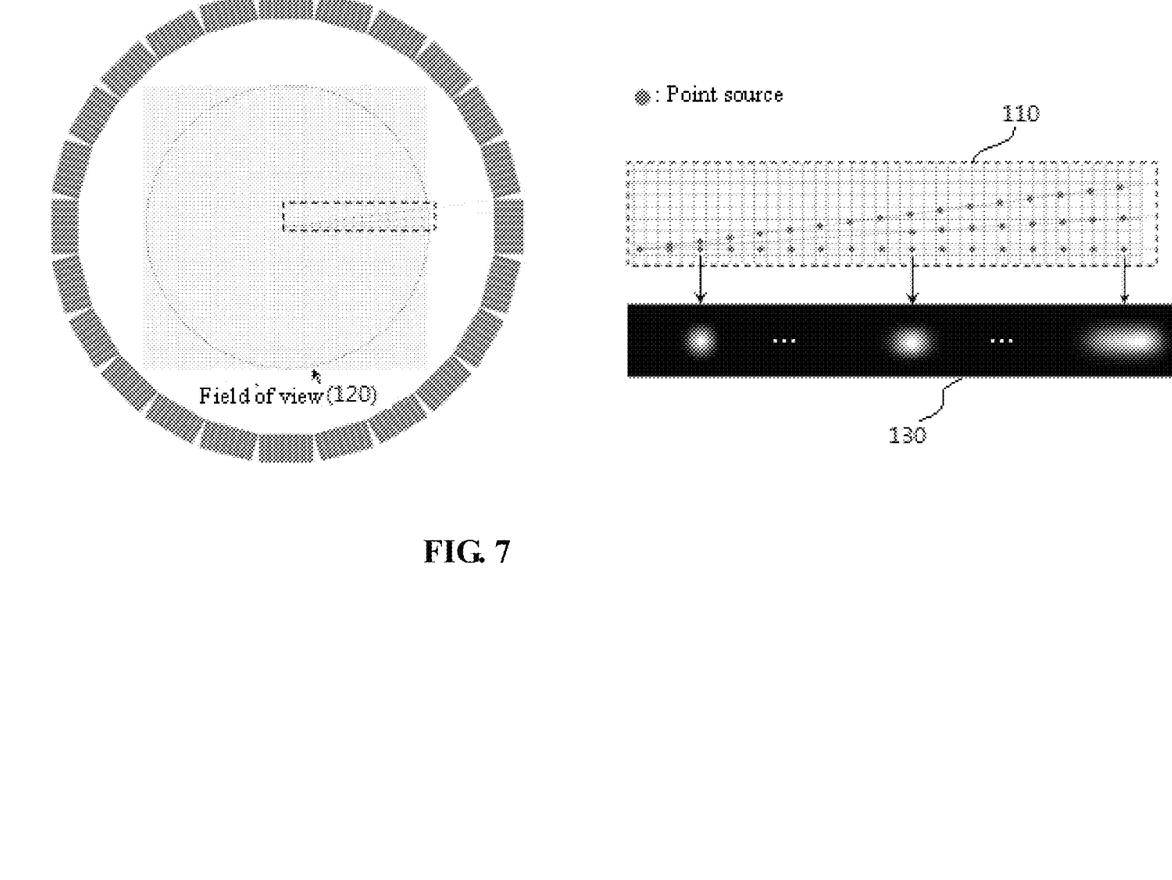
FIG. 7 illustrates an example of a change in a PSF based on a voxel location.

FIG. 7 illustrates an example of a change in a PSF based on a voxel location.

Referring to FIG. 7, in a general medical imaging system, a PSF 110 may be differently measured based on a voxel location. In particular, as indicated by 130, the PSF 110 may appear to be spread horizontally while getting closer to the outskirt of a field of view (FOV) 120. Here, a voxel refers to a volume pixel and represents a pixel that is expanded to a 3D space. That is, a voxel may indicate a data sample of precisely obtained actual volume.

According to an embodiment of the present invention, an apparatus for interpolating the PSF 110 may measure the PSF 110 with respect to each of a plurality of voxel locations of the medical imaging system using the aforementioned property, and may acquire a resolution-enhanced mage by applying a predetermined image reconfiguration algorithm. A further description related thereto will be made below.

Figure 8:
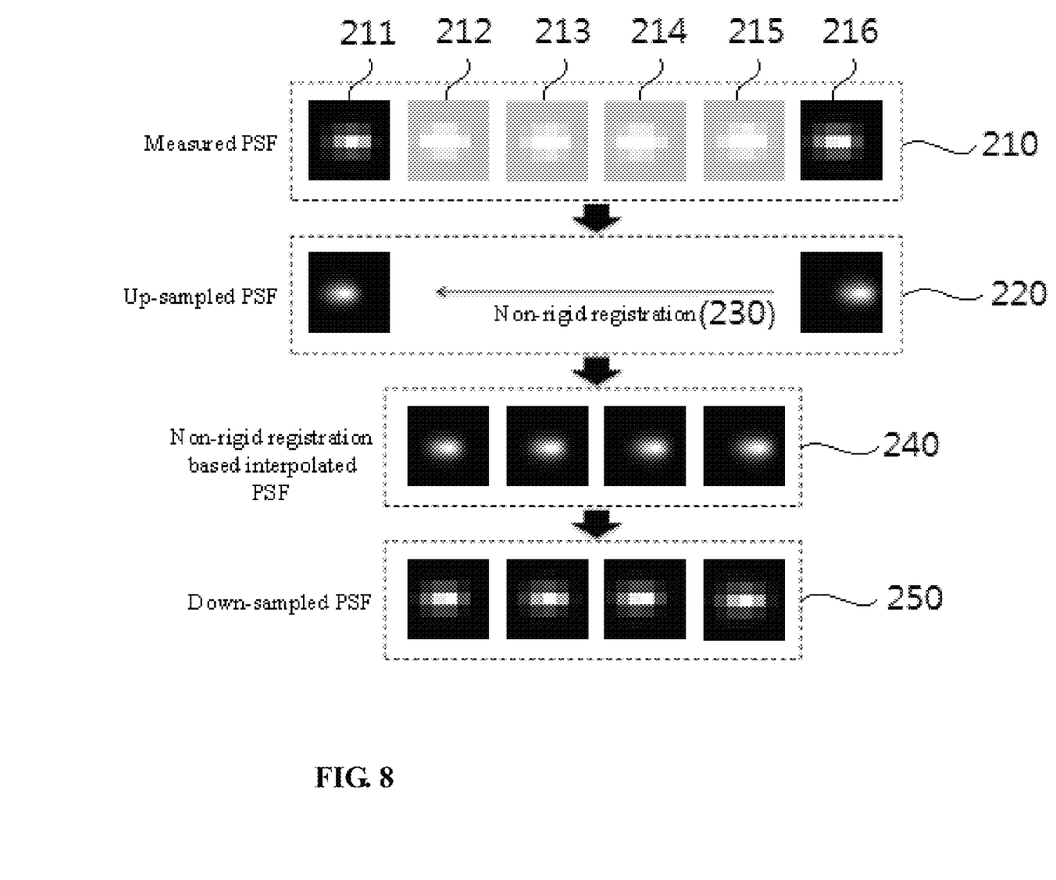
FIG. 8 illustrates a process of interpolating a PSF using a non-rigid registration according to an embodiment of the present invention.

FIG. 8 illustrates a process of interpolating a PSF using a non-rigid registration according to an embodiment of the present invention.

Referring to FIG. 8, in operation 210, an apparatus (hereinafter, an interpolation apparatus) for interpolating a PSF using a non-rigid registration may measure and thereby image a PSF sinogram with respect to at least one voxel location among a plurality of voxel locations of a medical imaging system by performing an MC simulation based on symmetry of the medical imaging system.

Here, the interpolation apparatus may measure the PSF sinogram with respect to the at least one voxel location to minimize the number of the at least one voxel location. For example, at least one voxel location may be selected based on the minimum count required to apply an interpolation method, and a PSF sinogram may be measured with respect to the selected at least one voxel location.

In operation 210, the measured PSF sinogram may be imaged using a predetermined image reconfiguration algorithm. The predetermined image reconfiguration algorithm may include a variety of algorithms for reconfiguring an image. For example, the predetermined image reconfiguration algorithm may include at least one of an OSEM algorithm, an LOR-based OSEM algorithm, a deblur algorithm, and a super-resolution algorithm.

Accordingly, in operation 210, the interpolation apparatus may measure and thereby image only PSF sinograms corresponding to a first voxel location 211 and a sixth voxel location 216 among the first voxel location 211, a second voxel location 212, a third voxel location 213, a fourth voxel location 214, a fifth voxel location 215, and the sixth voxel location 216. Therefore, an amount of time used to measure a PSF with respect to the medical imaging system may be significantly decreased.

In operation 220, the interpolation apparatus may up-sample the imaged PSF. Here, when operation 220 of up-sampling the imaged PSF is not required, operation 220 may not be performed. Conversely, when operation 220 is to be performed, the PSF may need to be interpolated with respect to remaining voxel locations excluding the at least one voxel location from among the plurality of voxel locations of the medical imaging system. Next, operation 250 of downsampling the interpolated PSF may need to be performed to correspond to operation 220.

Next, the interpolation apparatus may acquire a deformation field by performing a non-rigid registration 230 on the imaged PSF. Here, the non-rigid registration 230 aims to acquire the deformation field during a process of converting a source image of the imaged PSF to a target image of the imaged PSF. Accordingly, a distribution of brightness values between the source image and the target image may be used to find a deformation function suitable for the non-rigid registration 230. For example, for the non-rigid registration 230, an image that matches the target image may be generated by generating a two-dimensional (2D) combined histogram based on brightness values between two images, that is, the source image and the target image, by calculating normalized mutual information (NMI) of the two images using the 2D combined histogram, and by performing an optimization process of updating a deformation function. Here, a value in which a minus sign is added to a value of the NMI may be used as cost of the two images, for example, the source image and the target image, and may be defined as a cost calculation function.

Hereinafter, a process of performing the non-rigid registration 230 will be further described.

Initially, the interpolation apparatus may locally deform a source image of the imaged PSF using a B-spline free form deformation (FFD) based on a deformation function. Here, an FFD conversion equation may be defined as a displacement of control points having uniform intervals in a 3D image and the displacement of control points may be expressed by deformation function ($\Phi$). Here, a local deformation with respect to the entire object to be deformed by the deformation function is expected to be smooth and thus, may be estimated as a smooth transformation. Accordingly, 3D restraint $C_{smooth}$ corresponding to 2D bending energy of a thin-plate of metal may be defined and used.

The interpolation apparatus may calculate NMI of the source image and a target image using a 2D combined histogram that is calculated based on brightness values between the deformed source image and the target image of the imaged PSF. Also, the interpolation apparatus may generate a cost function as expressed by Equation 3, NMI of the source image and the target image based on C and $C_{smooth}$.

$$C_{k+1} = C_k + \lambda \cdot C_{smooth} \quad \text{[Equation 3]}$$

In Equation 3, $\lambda$ may represent a tradeoff between alignment of two images and $C_{smooth}$ that is smoothness of deformation. Here, k may denote a natural number greater than or equal to "1".

The interpolation apparatus may perform an optimization process of updating the deformation function using a cost function based on the NMI of the source image and the target image. For example, the interpolation apparatus may perform the optimization process of updating the deformation function $\Phi$ using a gradient of the cost function as expressed by Equation 4, according to a gradient descent scheme.

$$\Phi_{k+1} = \Phi_k + \mu \nabla C \quad \text{[Equation 4]}$$

In Equation 4, $\mu$ denotes a step size and k may represent a repetition state of gradient descent as a natural number. Here, for embodiment, $\Delta C$ may be approximated to a differential value.

Also, the optimization process for the cost function $C_k$ may be terminated if a condition of a small positive value $\epsilon$ is satisfied as expressed by Equation 5.

$$|C_k - C_{k-1}| < \epsilon \quad \text{[Equation 5]}$$

The interpolation apparatus may generate an image that matches the target image by applying, to the source image, variables calculated through the optimization process of the deformation function. Here, the image that matches the target image may include a deformation field. For example, the image that matches target image may refer to an image in which a PSF with respect to remaining voxel locations excluding at least one voxel location from among the plurality of voxel locations of the medical imaging system is interpolated in operation 240.

As described above, in operation 240, the interpolation apparatus may interpolate the PSF with respect to the remaining voxel locations excluding the at least one voxel location from among the plurality of voxel locations of the medical imaging system, using the deformation field acquired as a result of performing the non-rigid registration 230. For example, the PSF with respect to the second voxel location 212, the third voxel location 213, the fourth voxel location 214, and the fifth voxel location 215 may be interpolated in operation 240.

Once operation 220 of up-sampling the imaged PSF is completed, the interpolation apparatus may perform operation 250 of down-sampling the interpolated PSF to correspond to operation 220. Conversely, when operation 220 is not performed, the interpolation apparatus may not perform operation 250.

Through a process of interpolating a PSF using a non-rigid registration, the interpolation apparatus may quickly and efficiently acquire a PSF using a relatively small amount of memory with respect to all the voxel locations of the medical imaging system.

Also, since the PSF is acquired with respect to all the voxel locations, an accurate system matrix may be modeled.

Figure 9:
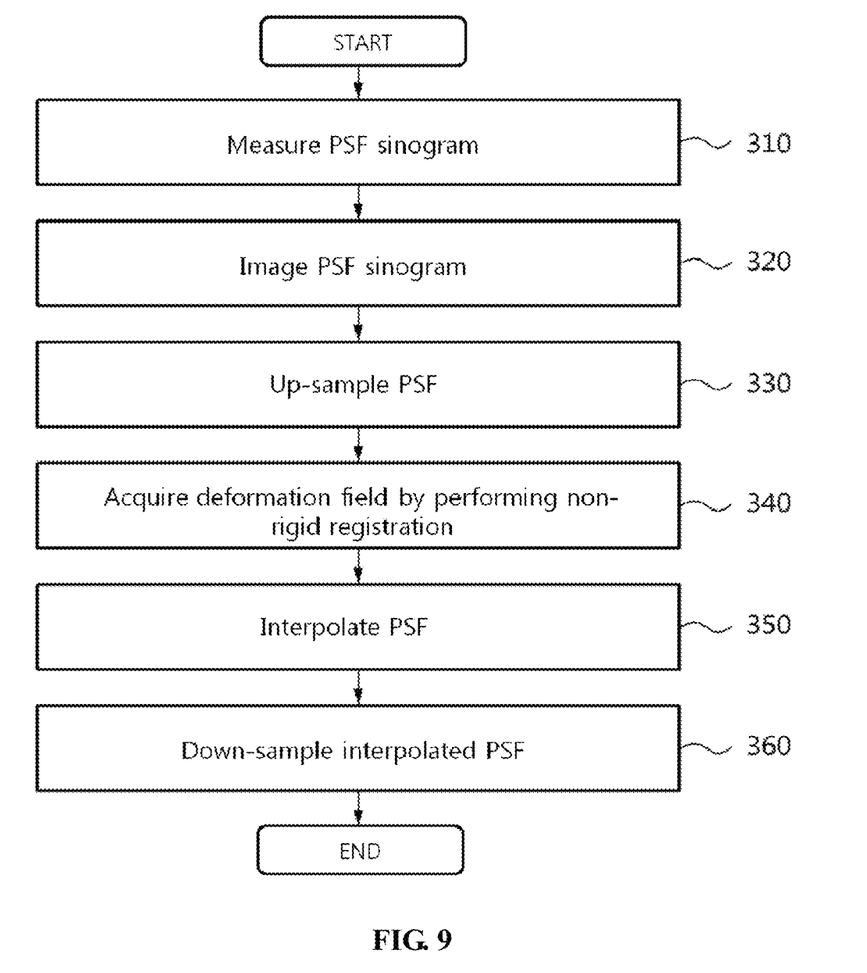
FIG. 9 is a flowchart illustrating a method of interpolating a PSF using a non-rigid registration according to an embodiment of the present invention.

FIG. 9 is a flowchart illustrating a method of interpolating a PSF using a non-rigid registration according to an embodiment of the present invention.

Referring to FIG. 9, in operation 310, an interpolation apparatus may measure a PSF sinogram with respect to at least one voxel location among a plurality of voxel locations of a medical imaging system by performing an MC simulation based on symmetry of the medical imaging system. Here, the interpolation apparatus may measure the PSF sinogram with respect to the at least one voxel location to minimize the number of the at least one voxel location.

In operation 320, the interpolation apparatus may image the measured PSF sinogram using a predetermined image reconfiguration algorithm.

In operation 330, the interpolation apparatus may up-sample the imaged PSF. Here, operation 330 may be omitted depending on a necessity. When operation 330 is to be performed, operation 360 of down-sampling the interpolated PSF may be performed to correspond to operation 330 after interpolating the PSF. A description related thereto will be made below.

In operation 340, the interpolation apparatus may acquire a deformation field by performing a non-rigid registration on the imaged PSF.

In operation 350, the interpolation apparatus may interpolate the PSF with respect to remaining voxel locations excluding the at least one voxel location from among the plurality of voxel locations of the medical imaging system, using the acquired deformation field. Here, when operation 330 is omitted, operation 360 may also be omitted.

In operation 360, operation 330 of up-sampling the imaged PSF is performed, the interpolation apparatus may down-sample the interpolated PSF. In this instance, when operation 330 is omitted, operation 360 of down-sampling the interpolated PSF may also be omitted.

Figure 10:
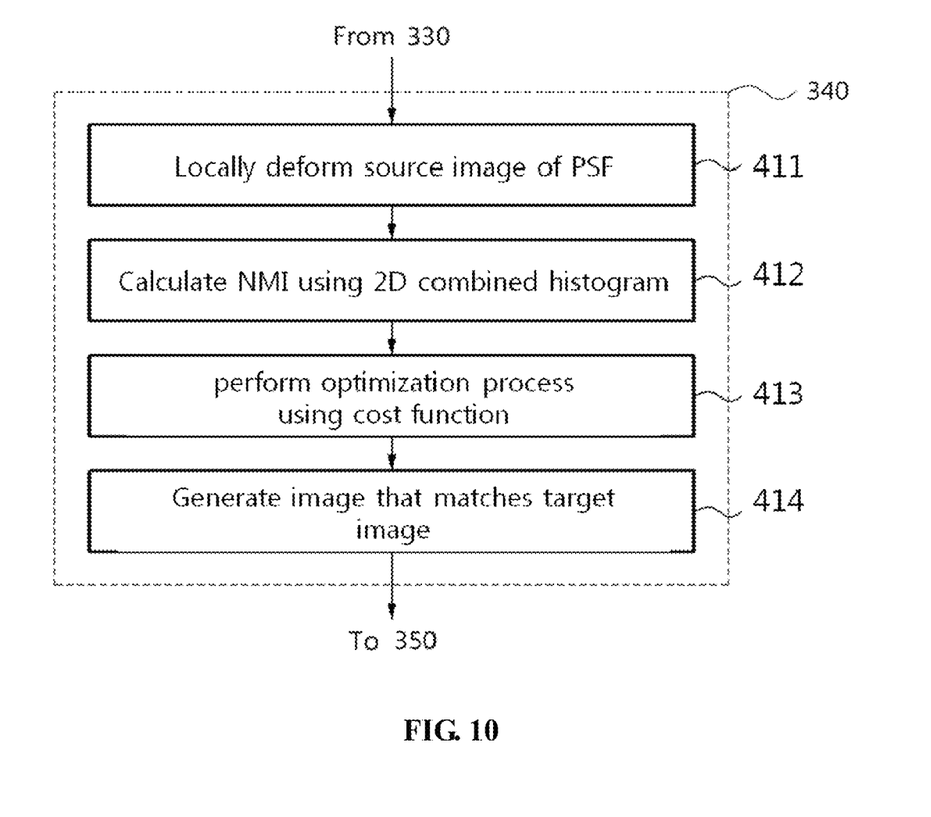
FIG. 10 is a flowchart illustrating in detail an operation of acquiring a deformation field of FIG. 9.

FIG. 10 is a flowchart illustrating in detail operation 340 of acquiring a deformation field of FIG. 9.

Referring to FIG. 10, in operation 411, the interpolation apparatus may locally deform a source image of the imaged PSF using a B-spline FFD based on a deformation function.

In operation 412, the interpolation apparatus may calculate NMI of the source image and a target image using a 2D combined histogram that is calculated based on brightness values between the deformed source image and the target image of the imaged PSF.

In operation 413, the interpolation apparatus may perform an optimization process of updating the deformation function using a cost function based on the NMI of the source image and the target image.

In operation 414, the interpolation apparatus may generate an image that matches the target image by applying, to the source image, variables calculated through the optimization process of the deformation function.

Figure 11:
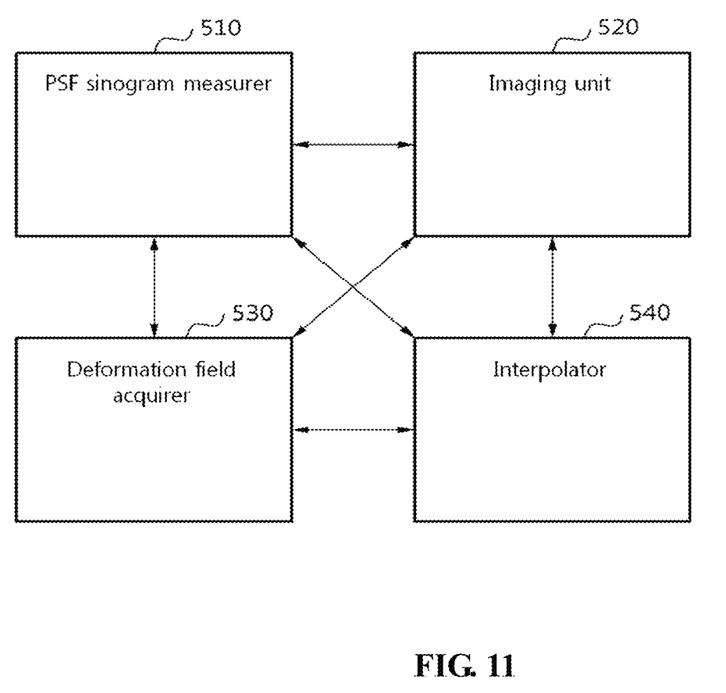
FIG. 11 is a block diagram illustrating an apparatus for interpolating a PSF using a non-rigid registration according to an embodiment of the present invention.

FIG. 11 is a block diagram illustrating an apparatus (hereinafter, an interpolation apparatus) for interpolating a PSF using a non-rigid registration according to an embodiment of the present invention.

Referring to FIG. 11, the interpolation apparatus may include a PSF sinogram measurer 510, an imaging unit 520, a deformation field acquirer 530, and an interpolator 540.

The PSF sinogram measurer 510 may measure a PSF sinogram with respect to at least one voxel location among a plurality of voxel locations of a medical imaging system by performing an MC simulation based on symmetry of the medical imaging system.

Here, the PSF sinogram measurer 510 may measure the PSF sinogram with respect to the at least one voxel location to minimize the number of the at least one voxel location.

The imaging unit 520 may image the measured PSF sinogram using a predetermined image reconfiguration algorithm.

The deformation field acquirer 530 may acquire a deformation field by performing a non-rigid registration on the imaged PSF.

Also, although not illustrated, the deformation field acquirer 530 may include an up-sampler configured to up-sample the imaged PSF. Here, the up-sampler may be included in the interpolation apparatus as a separate block.

The interpolator 540 may interpolate the PSF with respect to remaining voxel locations excluding the at least one voxel location from among the plurality of voxel locations of the medical imaging system, using the acquired deformation field.

Also, although not illustrated, the interpolation apparatus may further include a down-sampler configured to down-sample the interpolated PSF The up-sampler and the down-sampler may be omitted depending on a necessity.

According to embodiments of the present invention, it is possible to quickly perform an image reconfiguration process without a need to preprocess a sinogram. In addition, it is possible to acquire a super-resolution PET image having a further enhanced resolution compared to an existing image reconfiguration algorithm.

Also, according to embodiments of the present invention, it is possible to decrease an image reconfiguration complexity and to quickly perform an image reconfiguration process with a relatively small amount of calculation by applying, to an image reconfiguration algorithm, a projection method suitable for parallel processing and a sinogram format.

Also, according to embodiments of the present invention, it is possible to acquire a super-resolution PET image through one-step algorithm processing by merging an EM-based iterative image reconfiguration algorithm and a super-resolution algorithm.

Also, according to embodiments of the present invention, it is possible to acquire a more accurate super-resolution PET image by modeling a blur of a point corresponding to each location of a PET system.

Also, according to embodiments of the present invention, there may be provided a method, apparatus, and system for quickly and efficiently acquiring a PSF with respect to all of voxel locations of a medical imaging system by interpolating a PSF measured at the medical imaging system.

Also, according to embodiments of the present invention, there may be provided a method, apparatus, and system for interpolating a PSF by measuring a PSF sinogram with respect to all of voxel locations, to minimize a number of voxel locations of a medical imaging system based on symmetry of the medical imaging system.

Also, according to embodiments of the present invention, there may be provided a method, apparatus, and system for performing a non-rigid registration during a process of interpolating a PSF.

Meanwhile, the above-described embodiments of the present invention may be implemented using a computer program. Codes and code segments of the computer program may be easily inferred by a computer programmer in the art. Also, the computer program may be recorded in non-transitory computer-readable recording media and be read and executed on a computer, thereby embodying the method of the present invention. The non-transitory computer-readable media may include any type of computer-readable recording media.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for reconfiguring a positron emission tomography (PET) image using a cone-beam based line-of-response (LOR) reconfiguration, the apparatus comprising:
    a blur model maker configured to model a blur by generating a point spread function (PSF) kernel corresponding to each location of a PET system;
    an LOR acquirer configured to acquire an LOR and a sinogram corresponding to each location by wobbling the PET system or detecting a motion due to respiration of subject;
    a cone-beam sinogram converter configured to convert, to a sinogram format in a cone-beam shape, an LOR-based sinogram acquired by the LOR acquirer;
    a sinogram model maker configured to model the sinogram format-converted to the cone-beam shape by the cone-beam sinogram converter; and
    a high-resolution image inducer configured to induce a high-resolution image using the sinogram modeled by the sinogram model maker.

2. The apparatus of claim 1, wherein the sinogram model maker is configured to model the sinogram format-converted to the cone-beam shape by the cone-beam sinogram converter, using the high-resolution image, the wobbling acquired by the LOR acquirer, and the blur modeled by the blur model maker.

3. The apparatus of claim 1, wherein the high-resolution image inducer is configured to induce the high-resolution image by performing a parallel processing operation on a forward projection and a back-projection with respect to the sinogram modeled by the sinogram model maker.

4. The apparatus of claim 1, wherein the sinogram model maker is configured to model projected data to the sinogram by warping the high-resolution image through wobbling and by blurring and down-sampling the warped high-resolution image.

5. The apparatus of claim 4, wherein the blur model maker is configured to model the blur by generating the PSF kernel corresponding to each location according to a Monte-Carlo simulation based on a point source.

6. The apparatus of claim 4, wherein the cone-beam sinogram converter is configured to format-convert the sinogram to be spread in a cone shape in a second area in which a second detector is present by using, as a vertex, a crystal of a first detector in a first area of the PET system.

7. The apparatus of claim 4, wherein the high-resolution image inducer is configured to induce the high-resolution image by performing a parallel processing operation on a forward projection and a back-projection based on an iterative reconfiguration.

8. The apparatus of claim 7, wherein the high-resolution image inducer is configured to apply a gather operator to the forward projection and to apply a scatter operator to the back-projection when performing a line-driven-based parallel processing operation.

9. The apparatus of claim 7, wherein the high-resolution image inducer is configured to apply a scatter operator to the forward projection and to apply a gather operator to the back-projection when performing a voxel-driven-based parallel processing operation.

10. A method of interpolating a point spread function (PSF) using a non-rigid registration in a medical image, the method comprising:
    measuring a PSF sinogram with respect to at least one voxel location among a plurality of voxel locations of a medical imaging system by performing a Monte-Carlo simulation based on symmetry of the medical imaging system;
    imaging the measured PSF sinogram using a predetermined image reconfiguration;
    acquiring a deformation field by performing a non-rigid registration on the imaged PSF; and
    interpolating the PSF with respect to remaining voxel locations excluding the at least one voxel location from among the plurality of voxel locations of the medical imaging system, using the acquired deformation field.

11. The method of claim 10, wherein the measuring of the PSF sinogram comprises measuring the PSF sinogram with respect to the at least one voxel location to minimize the number of the at least one voxel location.

12. The method of claim 10, wherein the acquiring of the deformation field comprises up-sampling the imaged PSF.

13. The method of claim 10, further comprising:
    down-sampling the interpolated PSF.

14. The method of claim 10, wherein the acquiring of the deformation field comprises:
    locally deforming a source image of the imaged PSF using a B-spline free form deformation (FFD) based on a deformation function;

calculating normalized mutual information (NMI) of the source image and a target image using a two-dimensional (2D) combined histogram that is calculated based on brightness values between the deformed source image and the target image of the imaged PSF;

performing an optimization process of updating the deformation function using a cost function based on the NMI of the source image and the target image; and generating an image that matches the target image by applying, to the source image, variables calculated through the optimization process of the deformation function.

15. The method of claim 10, wherein the imaging of the measured PSF sinogram comprises imaging the measured PSF sinogram using at least one of an ordered subset expectation maximization (OSEM) algorithm, a line-of-response (LOR)-based OSEM algorithm, a deblur algorithm, and a super-resolution algorithm.

\* \* \* \* \*